United States Patent [19]

Glenn et al.

[11] Patent Number: 5,650,232

[45] Date of Patent: Jul. 22, 1997

[54] METHOD FOR MAKING SEAMLESS CAPSULES

[75] Inventors: Blake H. Glenn, Randolph; Jesse J. Kiefer, Belvidere, both of N.J.

[73] Assignee: Warner-Lambert Company, Morris Plains, N.J.

[21] Appl. No.: 325,722

[22] Filed: Oct. 7, 1994

[51] Int. Cl.⁶ .................. B32B 5/16; B32B 9/00; B32B 9/02; B32B 9/04
[52] U.S. Cl. .................. 428/402.2; 428/402.21
[58] Field of Search .............. 428/402.2, 402.11

[56] References Cited

U.S. PATENT DOCUMENTS

| | | |
|---|---|---|
| 3,389,194 | 6/1968 | Somerville .................. 428/402.2 |
| 3,423,489 | 1/1969 | Arens et al. .................. 264/4 |
| 3,779,942 | 12/1973 | Bolles .................. 253/316 |
| 3,962,383 | 6/1976 | Hagiwara et al. .................. 264/4 |
| 4,251,195 | 2/1981 | Suzuki et al. .................. 425/6 |
| 4,422,985 | 12/1983 | Morishita et al. .................. 264/44 |
| 4,426,337 | 1/1984 | Suzuki et al. .................. 264/4 |
| 4,695,466 | 9/1987 | Morishita et al. .................. 424/456 |
| 4,888,140 | 12/1989 | Schlameus et al. . |
| 5,362,564 | 11/1994 | Suzuki et al. .................. 428/402.2 |

FOREIGN PATENT DOCUMENTS

| | | |
|---|---|---|
| 0525731 | 2/1991 | European Pat. Off. . |
| 2336176 | 7/1977 | France . |
| 2746489 | 4/1979 | Germany . |
| 6142493 | 5/1994 | Japan . |

OTHER PUBLICATIONS

Toshiyuki Suzuki, et al, "Process of Forming Seamless Capsules by Concentric Nozzle System" KONA Powder Science and Technology in Japan No. 3, 1985, pp. 32–37.

Suzuki et al. "Process of Forming Seamless Capules by Concentric Nozzle System" KONA, Powder Science & Tech in Japan, No. 3 (1985).

*Primary Examiner*—Nathan M. Nutter
*Attorney, Agent, or Firm*—Linda A. Vag

[57] ABSTRACT

The present invention relates to a method for making a seamless capsule containing a shell material encapsulating a fill material by setting the fluid volumetric flux of the shell material equal to that of the fill material through concentrically aligned nozzles.

14 Claims, 2 Drawing Sheets

METHOD FOR MAKING SEAMLESS CAPSULES

BACKGROUND OF THE INVENTION

1. Field of the Invention

The present invention relates to a method for making a seamless capsule comprising a shell material encapsulating a fill material by employing a concentrically aligned multiple nozzle system.

2. Description of the Prior Art

Seamless capsules containing a shell material encapsulating a fill material have been made for a variety of applications such as center-filled chewing gums, encapsulated medicines, foods, cosmetics, industrial chemicals, and the like. These seamless capsules are usually made by simultaneously extruding the shell material and the fill material through concentrically aligned nozzles such that the extruded shell material encapsulates the extruded fill material. Up to the present time, the mass ratio of the fill material to the shell material in the capsule is usually controlled by manipulating the volumetric flow rate of the shell material relative to that of the fill material through the nozzles. For example, Toshiyuki Suzuki, et al., "Process of Forming Seamless Capsules by Concentric Nozzle System," KONA Powder Science and Technology in Japan, No. 3 (1985) pp. 32–37 disclose a process for forming seamless capsules by experimenting with different flow rates for the shell and fill materials. However, controlling the mass ratio by varying the volumetric flow rates is often difficult and requires considerable experimentation of different flow rates for different shell and fill materials, thereby making the process inefficient and difficult to achieve steady state. In addition, adjusting flow rates to control mass ratio often requires the core material to move at a different flow rate than the shell material, thereby resulting in process instabilities and capsules that have leaky cores.

The present invention overcomes the drawbacks of the prior art by providing a novel method for preparing a seamless capsule by setting the fluid volumetric flux of the shell material equal to that of the fill material through the concentrically aligned nozzles. As a result, the mass ratio of the fill material to the shell material in the capsule can be controlled by merely varying the size of the orifice areas of the concentrically aligned nozzles without experimenting with the flow rates, thereby making the process efficient and easy to achieve steady state. The resultant capsules have excellent shell integrity and few leaky cores.

SUMMARY OF THE INVENTION

The present invention provides a method for making a seamless capsule comprising a shell material encapsulating a fill material comprising the steps of:

providing a concentrically aligned multiple nozzle system having at least an outer nozzle and an inner nozzle;

supplying a shell material to said outer nozzle and a fill material to said inner nozzle;

simultaneously extruding said shell material through said outer nozzle and said fill material through said inner nozzle, wherein the fluid volumetric flux of said shell material through said outer nozzle is equal to the fluid volumetric flux of said fill material through said inner nozzle.

DETAILED DESCRIPTION OF THE INVENTION

In the present invention, the fluid volumetric flux of a material flowing from a nozzle orifice is defined as the ratio of the volumetric flow rate of the material through the nozzle to the nozzle orifice area. By setting the fluid volumetric flux of the shell material equal to that of the fill material through the concentrically aligned nozzles, the mass ratio of the fill material to the shell material in the capsule can be controlled by varying the size of the orifice areas of the nozzles.

Figure 1:
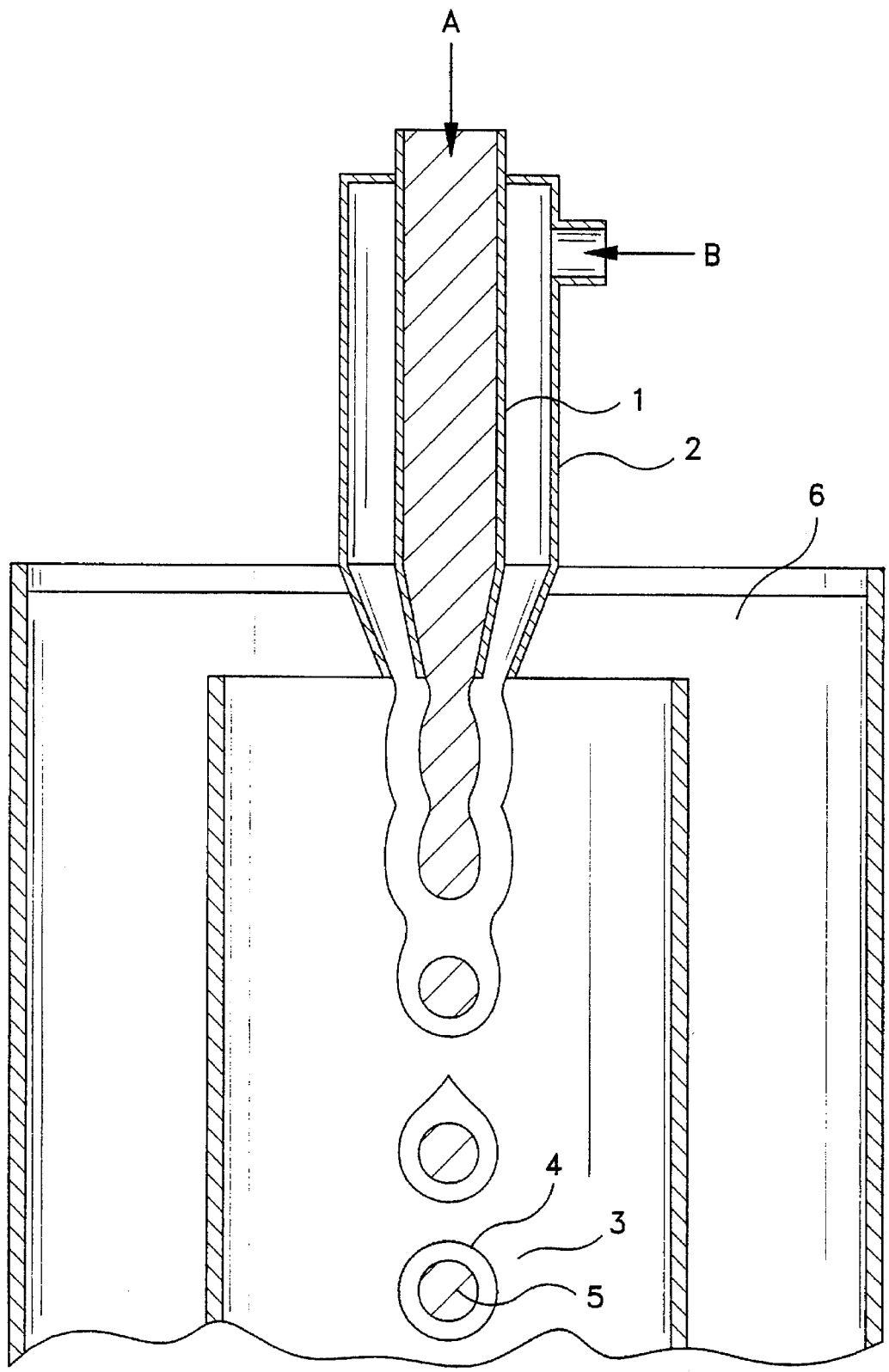
FIG. 1 is a schematic sectional view of a concentrically aligned multiple nozzle system suitable for use in the present invention.

FIG. 1 illustrates a suitable concentrically aligned multiple nozzle system for use in the present invention. The multiple nozzle system includes for example the following components: an inner nozzle 1 for receiving and dispensing a fill material supplied to the inner nozzle 1 from A; and an outer nozzle 2 for receiving and dispensing a shell material supplied to the outer nozzle 2 from B. The inner nozzle 1 and the outer nozzle 2 are concentrically aligned. The fill material and the shell material are simultaneously extruded from the inner nozzle 1 and the outer nozzle 2, respectively, to form a coaxial stream into a stream of downward flowing carrier fluid 6. The extruded shell material 4 encapsulates the extruded fill material 5 to form capsules 3. Typically, the capsules formed have an outer diameter ranging from about to 1 mm to 8 mm, preferably from about 4 to 6 mm, and a fill material to shell material mass ratio of about 9:1 to 1.5:1, preferably about 3.5:1 to 1.7:1.

The capsules formed usually undergo a number of post processing treatments. Typically, the capsules are cooled in the carrier fluid to allow the shell material to set, rinsed in a solvent, and then dried. Suitable rinsing solvents include isoparaffinic petroleum hydrocarbons, isopropanol, ethyl acetate, acetone, n-hexane, methanol, and ethanol. The rinsed capsules may also undergo centrifugation to remove any excess solvent on the capsules. Drying can be done by fluid bed drying, tray drying, and the like. Prior to drying, the capsules may also be chemically treated to crosslink the shell material to improve shell strength, such as by treating a gelatin shell with glutaraldehyde.

Figure 2:
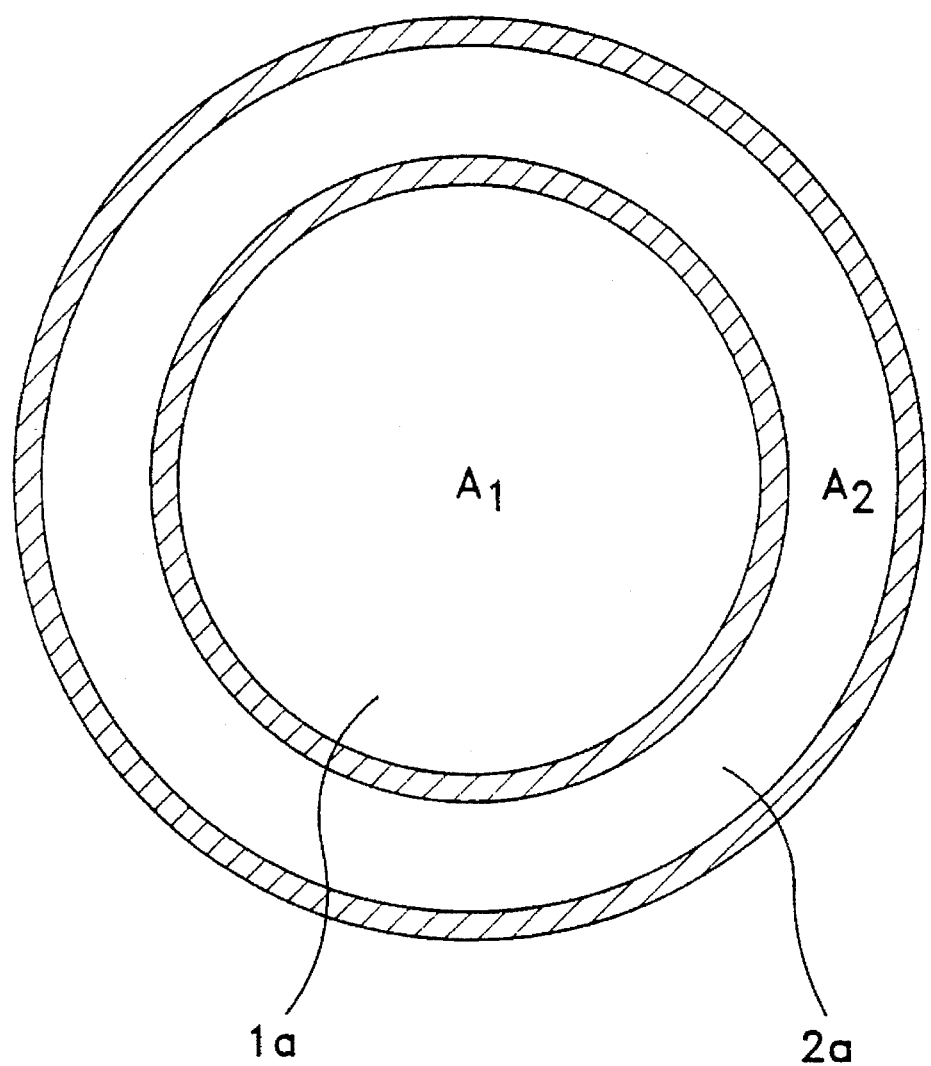
FIG. 2 is a bottom view of the multiple nozzle orifices of the concentrically aligned multiple nozzle system illustrated in FIG. 1.

FIG. 2 illustrates a bottom view of the multiple nozzle orifices of the concentrically aligned multiple nozzle system illustrated in FIG. 1. The multiple nozzle orifices include an inner nozzle orifice 1a having an orifice area $A_1$ and an outer nozzle orifice 2a having an annular orifice area $A_2$. The fill material is extruded from the inner nozzle 1 through the inner nozzle orifice 1a and the shell material is extruded from the outer nozzle 2 through the outer nozzle annular orifice 2a. Typically, the orifice area $A_1$ ranges from about 0.79 to about 4.67 mm$^2$ and the annular orifice area $A_2$ ranges from about 1.70 to about 18.31 mm$^2$.

Without being bound by this explication, the present inventors believe that the advantages of the present invention can be illustrated as follows. When the fluid volumetric flux of the shell material through the outer nozzle 2 is equal to that of the fill material through the inner nozzle 1, the ratio of the volumetric flow rate of the shell material $V_2$ to the outer nozzle annular orifice area $A_2$ is equal to the ratio of the volumetric flow rate of the fill material $V_1$ to the inner nozzle orifice area $A_1$ as illustrated by the following formula (I):

$$V_2/A_2 = V_1/A_1 \qquad (I)$$

As a result, the ratio of the volumetric flow rate of the fill material $V_1$ to the volumetric flow rate of the shell material $V_2$ is equal to the ratio of the inner orifice area $A_1$ to the outer annular orifice area $A_2$ as illustrated by the following formula (II):

$$V_1/V_2 = A_1/A_2 \quad (II)$$

The mass ratio of the mass of the fill material $M_1$ to the mass of the shell material $M_2$ can then be determined by following formula (III):

$$M_1/M_2 = d_1 V_1/d_2 w V_2 \quad (III)$$

wherein $d_1$ is the density of the fill material, $d_2$ is the density of the shell material, and w is the percent by weight of the solids in the shell material.

Since the volumetric flow rate ratio $V_1/V_2$ is equal to the orifice area ratio $A_1/A_2$ in accordance with the present invention, the mass ratio $M_1/M_2$ can be determined by the following formula (IV):

$$M_1/M_2 = d_1/d_2 w \times A_1/A_2 \quad (IV)$$

As a result, the ratio of the mass of fill material to the mass of shell material can be controlled by merely varying the ratio of the inner nozzle orifice area to the outer annular nozzle orifice area, i.e., by merely varying the size of the orifice areas of the nozzles employed.

The concentrically aligned multiple nozzle system that can be used in the present invention can have more than two concentrically aligned inner and outer nozzles. There can be one or more concentrically aligned intermediate nozzles positioned between the inner and outer nozzles, from which one or more intermediate shell materials can be extruded. In such embodiments, the shell material extruded from the outer nozzle encapsulates the intermediate shell material extruded from the intermediate nozzle, which in turn encapsulates the fill material extruded from the inner nozzle. In accordance with the present invention, the fluid volumetric flux of the intermediate shell material through the intermediate nozzle will be set to be equal to the fluid volumetric flux of shell material through the outer nozzle and the fluid volumetric flux of the fill material through the inner nozzle.

In the present invention any conventional shell material and fill material can be employed to make the seamless capsule. Typically, suitable shell materials are materials that are film-forming. Examples of suitable shell materials include gelatin, hydrocarbon waxes, hydrocarbon polymers, alkyl cellulose, water-soluble polymers such as hydroxyalkyl cellulose, water-soluble polyvalent alcohols or water-soluble derivatives thereof such as polyglycerin, sorbitol, ethylene glycol, polyethylene glycol, propylene glycol, polypropylene glycol, oligosaccharide, sugar ester, glyceride, sorbitan ester, and natural and synthetic gums. A preferred shell material according to the present invention is gelatin.

In a preferred embodiment, a surfactant is added to the shell material. Without wishing to be bound by any theory, the present inventors believe that the surfactant acts to lower the surface tension of the shell material, thereby allowing the shell material to spread over the fill material and facilitating capsule formation. Suitable surfactants include polyol stearates such as sorbitan monostearate, ethoxylated polyol stearates such as polyoxyethylene sorbitan monostearate, and those described in U.S. Pat. No. 3,779,942, which is herein incorporated by reference.

Suitable fill materials are typically in liquid form or meltable solid materials. Examples of suitable fill materials include medium chain triglyceride (MCT) oil such as coconut oil, peppermint oil, cinnamon oil, fennel oil, clove oil, wheat-germ oil, vegetable oil, vitamins, pharmaceutical solutions, natural and artificial sweeteners, menthol, and the like. A preferred filled material according to the present invention is MCT oil.

The present invention is useful to make seamless capsules for a variety of applications, such as center-filled chewing gums, encapsulated medicines, foods, cosmetics, industrial chemicals and the like.

The present invention will now be illustrated by the following non-limiting examples.

EXAMPLE 1

Seamless capsules were prepared by using a concentrically aligned multiple nozzle system having an inner nozzle and an outer nozzle. The inner nozzle had an inside diameter of 2 mm, an outside diameter of 2.5 mm, and an orifice area of 3.14 mm². The outer nozzle had an inside diameter of 3.5 mm and an annular orifice area of 4.71 mm². A gelatin solution having a density of 1.1 g/ml containing 33 weight % gelatin solids as the shell material was supplied to the outer nozzle at a temperature of 75° C. and a volumetric flow rate of 27 ml/min. MCT oil having a density of 0.925 g/ml was supplied to the inner nozzle as the fill material at a temperature of 25° C. and a volumetric flow rate of 18 ml/min. The gelatin solution and the MCT oil were simultaneously extruded from the outer and inner nozzles, respectively, at the same fluid volumetric flux of 5.73 ml/min.mm² into coconut oil cooled to a temperature of 10° C. and flowing downward at a rate of 2000 mL/minute. The extruded gelatin encapsulates the MCT oil to formed seamless capsules. The resultant capsules had a diameter of 4 to 5 mm and contained 62.95 weight % of the fill material and 37.05 weight % of the shell material with a fill:shell mass ratio of 1.7, which corresponded to the predicted value obtained by using Formula (IV) above.

EXAMPLE 2

Seamless capsules were prepared in the same manner as in Example 1 except that different nozzle sizes and different volumetric flow rates were employed. The inner nozzle had an inside diameter of 2.438 mm, an outside diameter of 3.429 mm, and an orifice area of 4.67 mm². The outer nozzle had an inside diameter of 4 mm and an annular orifice area of 3.33 mm². The gelatin solution was supplied to the outer nozzle at a volumetric flow rate of 9.28 ml/min and the MCT oil was supplied to the inner nozzle at a volumetric flow rate of 13 ml/min with the resultant fluid volumetric flux for both being 2.78 ml/min.mm². The formed capsules had a diameter of 2 to 4 mm and contained 78.12 weight % of the fill material and 21.88 weight % of the shell material with a fill:shell mass ratio of 3.57, which corresponded to the predicted value obtained by using Formula (IV) above.

EXAMPLE 3

Seamless capsules were prepared in the same manner as in Example 1 except that 0.5 weight % polyoxyethylene (20) sorbitan monooleate surfactant was added to the gelatin solution. In addition, the volumetric flow rate of the gelatin solution was changed to 15 ml/min and the volumetric flow rate of the MCT oil was changed to 10 ml/min with the resultant fluid volumetric flux for both being 3.18 ml/min.mm². The formed capsules had a diameter of 1 to 4 mm and contained 62.95 weight % of the fill material and 37.05 weight % of the shell material with a fill:shell mass ratio of 1.7, which corresponded to the predicted value obtained using Formula (IV).

EXAMPLE 4

Seamless capsules were prepared in the same manner as in Example 1 except that 1 weight % of polyoxyethylene (20) sorbitan monooleate surfactant was added to a gelatin solution containing 25 weight % solids and different nozzle sizes and different volumetric flow rates were employed. The inner nozzle had an inside diameter of 2 mm, an outside diameter of 2.6 mm, and an orifice area of 3.14 mm$^2$. The outer nozzle had an inside diameter of 3.3 mm and an annular orifice area of 3.24 mm$^2$. The gelatin solution was supplied to the outer nozzle at a volumetric flow rate of 16.11 ml/min and the MCT oil was supplied to the inner nozzle at a volumetric flow rate of 15.6 ml/min with the resultant fluid volumetric flux for both being 4.97 ml/min.mm$^2$. The formed capsules had a diameter of 1 to 4 mm and contained 76.51 weight % of the fill material and 23.49 weight % of the shell material with a fill:shell mass ratio of 3.26, which corresponded to the predicted value obtained by using Formula (IV) above.

While the present invention has been described with respect to what is presently considered to be the preferred embodiments, it is to be understood that the invention is not limited to the disclosed embodiments. The present invention is intended to cover various modifications and equivalent mechanisms included within the spirit and scope of the appended claims.

What is claimed is:

1. A method for making a seamless capsule comprising a shell material encapsulating a fill material comprising the steps of:

providing a concentrically aligned multiple nozzle system having at least an outer nozzle and an inner nozzle;

supplying a shell material to said outer nozzle and a fill material to said inner nozzle;

simultaneously extruding said shell material through said outer nozzle and said fill material through said inner nozzle, wherein the fluid volumetric flux of said shell material through said outer nozzle is equal to the fluid volumetric flux of said fill material through said inner nozzle.

2. The method for making a seamless capsule according to claim 1, wherein the mass ratio of the fill material to the shell material is controlled by varying the ratio of the inner nozzle orifice area to the outer annular nozzle orifice area.

3. The method for making a seamless capsule according to claim 1, wherein the mass ratio of the fill material to the shell material is controlled by varying the size of the orifice areas of the inner nozzle and/or the outer nozzle.

4. The method for making a seamless capsule according to claim 1, wherein a surfactant is added to the shell material.

5. The method for making a seamless capsule according to claim 1, further comprising the steps of rinsing and drying the capsule.

6. The method for making a seamless capsule according to claim 5, further comprising the step of chemically treating said capsule to crosslink the shell material prior to the drying step.

7. The method for making a seamless capsule according to claim 1, wherein the mass ratio of the fill material to the shell material is about 9:1 to 1.5:1.

8. The method for making a seamless capsule according to claim 7, wherein the mass ratio of the fill material to the shell material is about 3.5:1 to 1.7:1.

9. The method for making a seamless capsule according to claim 1, wherein the shell material is gelatin.

10. The method for making a seamless capsule according to claim 1, wherein the fill material is medium chain triglyceride oil.

11. The method for making a seamless capsule according to claim 1, wherein the seamless capsule has an outer diameter ranging from about 1 mm to 8 mm.

12. The method for making a seamless capsule according to claim 11, wherein the seamless capsule has an outer diameter ranging from about 4 to 6 mm.

13. The method for making a seamless capsule according to claim 1, wherein the inner nozzle has an inner orifice area of about 0.79 to about 4.67 mm$^2$ and the outer nozzle has an outer annular orifice area of about 1.70 to about 18.31 mm$^2$.

14. The method for making a seamless capsule according to claim 1, further comprising the steps of:

supplying at least one intermediate shell material through at least one intermediate nozzle positioned between said inner and outer nozzles in said concentrically aligned multiple nozzle system; and simultaneously extruding said intermediate shell material through said intermediate nozzle at the same fluid volumetric flux.

* * * * *